United States Patent
Tsai et al.

(12)

(10) Patent No.: US 6,290,892 B1
(45) Date of Patent: Sep. 18, 2001

(54) PROCESS FOR PREPARING A LAMINATED COMPOSITE OF ADDITION TYPE SILICONE RUBBER AND POLYURETHANE BY INDUCE SURFACE RECONSTRUCTION

(75) Inventors: Ming-Fu Tsai, Lung-Tan; Yu-Der Lee, Hsinchu; Yong Chien Ling, Lung-Tan; Wen-Hsiung Ku, Lung-Tan; Yuan-Chyi Lin, Lung-Tan, all of (TW)

(73) Assignee: Chung-Shan Institute of Science & Technology, Tao-Yuan (TW)

( * ) Notice: Subject to any disclaimer, the term of this patent is extended or adjusted under 35 U.S.C. 154(b) by 0 days.

(21) Appl. No.: 09/450,355

(22) Filed: Nov. 29, 1999

(51) Int. Cl.$^7$ .............................. B29C 41/02; B29C 41/20
(52) U.S. Cl. ................... 264/250; 264/331.11; 264/337; 264/338
(58) Field of Search ............................. 264/250, 331.11, 264/337, 338

(56) References Cited

U.S. PATENT DOCUMENTS 4,098,856 * 7/1978 Rosenau ........................... 264/337 X

OTHER PUBLICATIONS

Ming–Fu Tsai, Yu–Der Lee and Yong–Chien Ling; "Improved Adhesion of Silicone Rubber to Polyurethane by Induce Surface Reconsideration"; J. of Applied Polymer Science, vol. 70, No. 9, pp. 1669–1675; Nov. 28, 1998.

* cited by examiner

*Primary Examiner*—Leo B. Tentoni
(74) *Attorney, Agent, or Firm*—Jackson Walker L.L.P.

(57) ABSTRACT

Induced surface reconstruction of silicone rubber by blending silicone gel reactants of addition type with a modifier and curing with a mold having a high critical surface tension was used to improve the adhesion of chemically inert silicone rubber to polyurethane. The modifier has the following formula

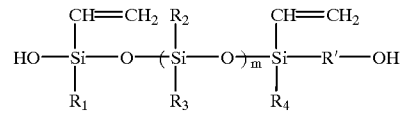

wherein m=25~50; $R_1$, $R_2$, $R_3$, and $R_4$ independently are alkyl; R' is R or OR, wherein R is a polymer backbone having a molecular weight of 1000~20000. The mold is formed with a material having a critical surface tension greater than that of a polymer having a repeating unit of said R.

29 Claims, No Drawings

PROCESS FOR PREPARING A LAMINATED COMPOSITE OF ADDITION TYPE SILICONE RUBBER AND POLYURETHANE BY INDUCE SURFACE RECONSTRUCTION

FIELD OF THE INVENTION

The present invention is related to a technique of bonding or adhering polyurethane to an addition type silicone rubber, and in particular to a technique of surface modification of an addition type silicone rubber to facilitate the bonding between the addition type silicone rubber and polyurethane.

BACKGROUND OF THE INVENTION

The unusual heat, electrical weather, and low-temperature resistance properties of silicones, i.e., room temperature-vulcanizable (RTV) silicone rubber, have manifested themselves in a wide variety of applications. They are used as engineering materials for manufacturing electrical apparatus and machines. Strong adhesion of silicones to the target matrix is a requirement for long product life. The inherently hydrophobic nature of silicones, coupled with their ability to segregate to the surface, facilitates their use as a surface modifier for other materials. This property has been exploited in the preparation of silicone-modified polyesters; the synthesis of polydimethylsiloxane (PDMS) and polystyrene copolymers; polyimidesiloxane segmented copolymers triblock siloxane copolymers used as surface modifying additives; blood-compatible polyurethane (PU)-polysiloxane graft copolymers [Y. Ezuka, T. Ono, and K. Imai, J. *Colloid Interface Sci.*, 136, 408 (1990)]: and the surface treatment of fumed silica for use as antifoammg compounds. Small amounts of the copolymers (ca. 1~4 by weight) could be added to different polymers to alter their surface properties. The air-polymer surface of the resulting polymer system is usually dominated by the low surface-energy siloxane, preventing adhesion to polar materials. This phenomenon of surface segregation of a component with a low surface energy in multi-component polymeric materials attracts attention to the analysis of polymer surfaces and the modifications of their properties [G. H. Frederickson, *Macromolecules*, 20, 2535 (1987); T. P. Russell, G. Coulon, V. R. Deline, and D. C. Miller, *Macromolecules*, 22, 4600 (1989); K. R. Shull, *Macromolecules*, 25, 2122 (1992)].

Surface modification of polymers by chemical, photochemical, corona, plasma, and high-energy radiation treatments are currently used to increase the polarity of polymer surfaces, thus enhancing their adhesion to immiscible polymers [C. M. Chan, *Polymer Surface Modification and Characterization*, Hanser Publishers, Munich, 1993; W. H. Waddall, L. R. Evans, J. G. Gillick, and D. Shuttleworth, *Rubber Chem. Technol.*, 65, 687 (1992)]. An alternative means of modifying polymer surface is by blending with diblock copolymers, where one block interacts favorably with the base matrix and the other block with the target matrix [T. P. Russell, V. R. Deline, V. S. Wakharkar, and G. Coulon, *MRS Bull.*, Oct., 33 (1989)]. The polymeric surface can form ordered, oriented layers at the surface during subsequent curing. The part of such copolymers with a low critical surface tension is readily miscible with the silicone base matrix, whereas the other part interacts favorably with the more polar matrix. Both blocks can anchor the copolymer into the respective substrate, which ensures permanency of the surface modification and increases adhesion between two immiscible polymers.

The low surface energy of the cured silicone rubber of addition type causes the polyurethane have insufficient wetability to adhere to the surface thereof.

A primary objective of the present invention is to provide a process for preparing a laminated composite of an addition type silicone rubber and polyurethane.

Another objective of the present invention is to provide a process for preparing an addition type silicone rubber having an increased surface energy by induce surface reconstruction.

Still another objective of the present invention is to provide a modifier for increasing a surface energy of an addition type silicone rubber.

SUMMARY OF THE INVENTION

In order to accomplish the objectives of the present invention, a process for preparing a laminated composite of an addition type silicone rubber and a polyurethane carried out in accordance with the present invention comprises the following steps:

(a) mixing a modifier, a silicone gel of addition type and a curing agent for said silicone gel to form a mixture, said modifier having the following formula (I):

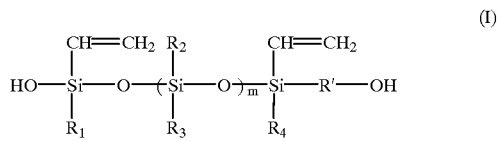

wherein m=25~50; $R_1$, $R_2$, and $R_3$, and $R_4$, independently are —$CH_3$ or —$CH_2CH_3$; R' is R or OR, wherein R is a polymer backbone having a molecular weight of 1000~20000;

(b) introducing said mixture from step (a) into a cavity of a mold, in which a surface of the cavity is formed by a material having a critical surface tension greater than that of a polymer having a repeating unit of said R;

(c) curing said mixture in said cavity to form a shaped article;

(d) removing said shaped article from said mold;

(e) placing a polyurethane precursor on a surface of said shaped article which contacts said surface of said cavity; and (f) curing said polyurethane precursor to form an cured polyurethane bonding to said surface of said shaped article, so that a laminated composite is formed.

In step (e), a suitable polyurethane precursor is a liquid mixture comprising a polyol, and a polyisocyanate, and optional a catalyst, wherein OH group: NCO group=0.7:1 to 0.9:1 (molar), preferably 0.8:1.

Alternatively, the polyurethane precursor is a solid polyurethane prepolymer having a tensile strength of 20~40 kg/cm² and an elongation ratio at break of 200~400%.

The curing in step (f) of the process of the present invention is preferably carried out at a temperature of 60° C. to 80° C. for a period longer than 120 hours.

Preferably, the process of the present invention further comprises (d') subjecting said shaped article to a heat treatment between step (d) and step (e). Said heat treatment is preferably carried out at a temperature of 30° C. to 200° C. for a period of 10 minutes to 24 hours.

The present invention also discloses a process for preparing an addition type silicone rubber having an enhanced critical surface tension, which comprises the steps (a) to (c) defined as above, and preferably further comprises step (d) and (d') defined as above following step (c).

Said silicone gel of addition type used in step (a) can be any polysiloxane containing a vinyl group known in the prior art, and preferably said silicone gel of addition type is a silicone having the following formula

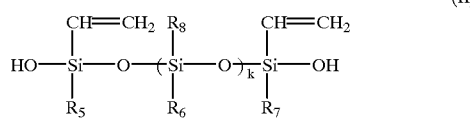
(II)

wherein k is a value so that the silicone (II) has a molecular weight of 1000~100000; and $R_5$, $R_6$, $R_7$, and $R_8$, independently are —$CH_3$ or —$CH_2CH_3$.

Preferably, R in the formula (I) is

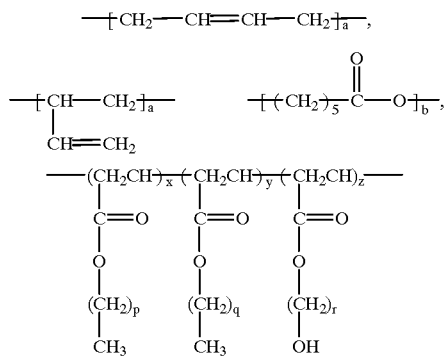

or a combination of each other, wherein a is an integer of 30~100, preferably a is an integer of 40~60; b is an integer of 20~80, preferably b is an integer of 40~50; y is an integer of 30~60; $z/(x+y)=0.01$~$0.25$, preferably $z/(x+y)=0.01$~$0.15$; and p, q and r independently are an integer of 1~20; preferably p=1, q=3, and r=2.

A suitable curing agent for said silicone gel in step (a) includes (but not limited thereto) compounds comprising a repeat unit of the following formula:

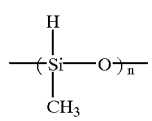

wherein n is a positive integer.

A suitable amount of said modified used in step (a) ranges from 0.5 to 10.0 phr (per hundred parts by weight of said silicone gel of addition type), and preferably from 1.0 to 3.0 phr.

Preferably, said curing in step (c) is carried out at a temperature from 60° C. to 80° C. for a period of 6 to 10 hours.

DETAILED DESCRIPTION OF THE PREFERRED EMBODIMENTS OF THE INVENTION

In this invention we describe a specific bond between silicone rubber of addition type and polyurethane (PU) using an induced surface reconstruction approach. This was realized by blending small amounts of the modifier (I) copolymer with the silicone gel of addition type, then casting them on appropriate molding plates during curing to induce the formation of desired surface property. The modifier (I) copolymers at the surface of the silicone rubber can serve as a bridge between the silicone rubber and PU. The polysiloxane part having vinyl groups of the modifier (I) can graft to the matrix of the silicone rubber, where as the polymer part (R) having hydroxy groups segregating to the surface participates in the crosslinking reaction of the PU target matrix.

EXPERIMENTAL

Materials

Vinyl dichorosilane was obtained from Huls company. HTPB was obtained from Arco having a code mane of R45-M. Hydroxyl-terminated PDMS was obtained from Dow Corning (Midland, Mich.) having a code name of $Q_1$-3563. HTPB and PDMS were dried in a rotary flask under vacuum at 70° C. for 4 h before use. The number-average molar mass ($\overline{Mn}$) and OH values are 2,300 and 0.82 for HTPB, 3,400 and 1.0 for PDMS, respectively. 2-hydroxy ethyl acrylate (2HEA), ethyl acrylate (EA), butyl acrylate (BA), and isopropanol (IPA) were obtained from Merck. Polycaprolactone-3000 (PCL-3000) was obtained from Solvay Interox. The silicone gel of addition type used was obtained from General Electric (Waterford, N.Y.) having a code name of RTV-630.

The low-density polyethylene (PE, density=0.95 g/cm³), Teflon (Du Pont TFE-Teflon, Wellington, Del.), and polyethylene terephthalate (PET, ICI) were used as the molds.

RTV-630 silicone contains a main part and a hardener part in a ratio of 10:1. The main part contains a vinyl-containing polysiloxane having a number averaged molecular weight of about 20000~30000 (molecular weight distribution ratio of about 2.3) and 20–30 wt % filler. The vinyl-containing polysiloxane is a copolymer of octamethyl cyclosiloxane and tetravinylcyclosiloxane, and the Si—CH=$CH_2$ content thereof is about 1.5~2.5%. The hardener part is a copolymer of octamethyl cyclosiloxane and tetrahydrocyclosiloxane, and the tetrahydrocyclosiloxane amount thereof is about 12–16%.

The reactions involved in the following Examples 1A and 1B are shown in the following Scheme 1.

Scheme 1

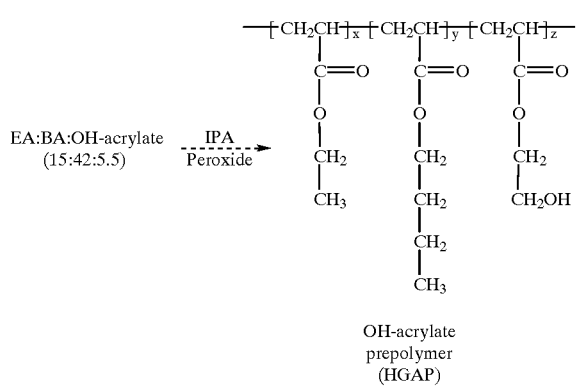

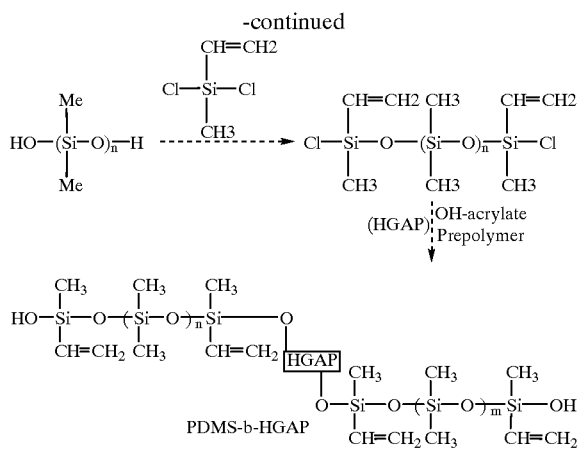

Example 1A

Synthesis of hydroxy graft acrylate block copolymer, HGAP

To a mixture of ethyl acrylate (EA), butyl acrylate (BA) and 2-hydroxy ethyl acrylate (2HEA) in a ratio of EA:BA:2HEA=13.05:36.54:3.645 (g), 0.06 g benzoic peroxide as an initiator and a solution of 30 g isopropanol (IPA) as an chain transfer agent in 5 g toluene were added to undergo a resulting hydroxy graft acrylate block copolymer, HGAP, has a number average molecular weight of about 4200 and a molecular weight distribution ratio of about 2.2.

Example 1B

Synthesis of PDMS-b-HGAP 95.5 g (0.028 mole) of PDMS ($Q_1$-3563) and 10 ml vinyl dichlosilane (0.07 mole) were added to 292 ml toluene, and the resulting mixture was heated to 60~70° C. for reacting 3 hours. The residual vinyl dichlosilane and solvent were removed therefrom at 80° C. and 10 torr to obtain a chloro vinyl terminated PDMS. 180 ml toluene and 30.013 moles of HGAP were added to the chloro vinyl terminated PDMS (equivalent ratio 1:1), and 4-methyl-morpholin was used as an acid absorber during a four-hour reaction at 80° C. The product, PDMS-b-HGAP copolymer, was isolated and purified by repeatedly washing with deionized distilled water.

Example 1C

Induced Surface Reconstruction of Silicone Rubber and Adhesion to PU

1% PDMS-b-HGAP and RTV-630 (silicone gel of addition type, the main part:hardener part=10:1) was homogeneously mixed in a beaker by stirring at ambient conditions. The samples were cured at 70° C. for 8 hours between smooth-surface molds in a hydraulically operated press at atmospheric pressure to induce surface reconstruction of the silicone rubber. The rubber was removed from the mold and placed under vacuum to remove volatile substances.

The PU target matrix was prepared by mixing hydroxyl terminated polybutadiene (HTPB), toluylene-2,4-diisocyanate (TDI), and antimony (III) oxide ($Sb_2O_3$) in the weight ratio of 100:7.80:180. The mixtures were poured on top of the silicone rubbers (native and surface-reconstructed). The curing reaction of PU was continued for 5 days at 70° C. under a hydraulically operated press at atmospheric pressure, unless otherwise specified.

The effects of mold materials on the peel strength between the surface modified silicone rubber and PU were investigated according to the ASTM-D903-49 peel test method with an instron. The results are shown in Table 1 together with the critical surface tension ($\gamma_c$) of the mold materials.

TABLE 1

| Mold material | Critical surface tension at 20° C. (dyn/cm) | Peel strength (kg/cm) |
| --- | --- | --- |
| Air | — | 0 |
| Teflon | 18 | 0 |
| Polyethylene | 31 | 0 |
| PET | 43~45 | 1.2 |

It can be seen from the data in Table 1 that only the PET mold induces an enhanced adhesion effect on the surface of the silicone rubber. This indicates that the high $\gamma_c$ of the mold material of PET has caused a segregation of the high surface-energy PDMS-b-HGAP blocks to the surface, as opposed to the lower surface-energy silicone blocks. The PDMS-b-HGAP blocks that have segregated to the surface of the silicone rubber may subsequently participate in the end-linking reaction of HTPB/TDI/$Sb_2O_3$ mixture to form the PU. The increased peel strength may therefore be attributed to the surface enrichment of PDMS-b-HGAP blocks. On the contrary, the peel strength between the silicone rubber cured with the PE mold and the PU is zero, which means the PE mold having a $\gamma_c$ of 31 dyn/cm is not able to induce a segregation of the high surface-energy PDMS-b-HGAP blocks to the surface of the silicone rubber. The $\gamma_c$ of HGAP is about 38~40 dyn/cm which is higher than that of the PE mold but lower than that of the PET mold. The measured static contact angles using deionized water are about 103 to 104 degrees, and about 112 to 114 degrees for the PET-treated and PE-treated silicone rubber containing PDMS-b-HGAP copolymers, respectively, which agrees with this suggestion.

The effect of the amount of PDMS-b-HGAP mixed with the silicone gel on the peel strength were also investigated. The results are shown in Table 2.

TABLE 2

| Amount of PDMS-b-HGAP | Mold material | Peel strength (kg/cm) |
| --- | --- | --- |
| 0.1 | PET | 0.3~0.4 |
| 0.5 | PET | 0.8~1.0 |
| 1.0 | PET | 1.1~1.2 |
| 5.0 | PET | 1.2~1.3 |
| 10.0 | PET | 0.8~1.0 |

It is apparent from Table 2 that 0.5%~5% of PDMS-b-HGAP is sufficient to induce an enhanced adhesion effect on the surface of the silicone rubber.

Example 1D

Heat treatment of the surface modified silicone rubber

The surface modified silicone rubber prepared by using the PET mold in Example 1C were subjected to heat treatments prior to the ASTM-D903-49 peel test. The conditions of heat treatments and the results are shown in Table 3.

TABLE 3

| Amount of PDMS-b-HGAP | Conditions of heat treatment | Peel strength (kg/cm) |
| --- | --- | --- |
| 1% | 50° C. × 30 min | 1.1 |
| 1% | 70° C. × 30 min | 1.2 |
| 1% | 100° C. × 30 min | 1.2 |
| 1% | 150° C. × 30 min | 1.2~1.3 |

It is believed that the heat treatment will cause a post curing of RTV-630 silicone rubber, creating a more dense silicone rubber matrix, so that the PDMS-b-HGAP blocks that have segregated to the surface of the silicone rubber matrix tend to remain at the surface, and thus the peel strength between the surface modified silicone rubber and PU increases as the temperature of the heat treatment increases.

Example 2A

Synthesis of PDMS-b-polycaprolactone (PCL)

84.66 g polycaprolactone (PCL-30000) was dissolved in a solvent mixture of 300 ml toluene and 150 ml THF. The resulting solution was added to the chloro vinyl terminated PDMS prepared according to Example 1B, and reacted at 80° C. for 5 hours. The product, PDMS-b-PCL copolymer, was isolated and purified by repeatedly washing with deionized distilled water.

Example 2B

Induced Surface Reconstruction of Silicone Rubber and Adhesion to PU

The procedures of Example 1C were repeated. The peel strength between the silicone rubber cured with different mold materials and PU are shown in Table 4.

TABLE 4

| Mold material | Critical surface tension at 20° C. (dyn/cm) | Peel strength (kg/cm) |
| --- | --- | --- |
| Air | — | 0 |
| Teflon | 18 | 0 |
| Polyethylene | 31 | 0 |
| Polypropylene | 31 | 0 |
| PET | 43~45 | 1.26 |

It can be seen from the data in Table 4 that only the PET mold induces an enhanced adhesion effect of the surface of the silicone rubber. This indicates that the high $\gamma_c$ of the mold material of PET has caused a segregation of the high surface-energy PDMS-b-PCL blocks to the surface, as opposed to the lower surface-energy silicone blocks. The PDMS-b-PCL blocks that have segregated to the surface of the silicone rubber may subsequently participate in the end-linking reaction of HTPB/TDI/Sb$_2$O$_3$ mixture to form the PU. The increased peel strength may therefore be attributed to the surface enrichment of PDMS-b-PCL blocks. On the contrary, the peel strength between the silicone rubber cured with the other mold materials is zero, which means the molds having a relative lower $\gamma_c$ are not able to induce a segregation of the high surface-energy PDMS-b-PCL blocks to the surface of the silicone rubber.

Similar results were observed by the inventors when the RTV-630 silicone gel was replaced with a heat resistant silicone gel based on polymethyl phenyl siloxane (available from Dow Corning under a code name of DC-93104.

What is claimed is:

1. A process for preparing a laminated composite of an addition type silicone rubber and a polyurethane comprising the following the steps:

(a) mixing a modifier, a silicone gel of addition type and a curing agent for said silicone gel to form a mixture, said modifier having the following formula (I):

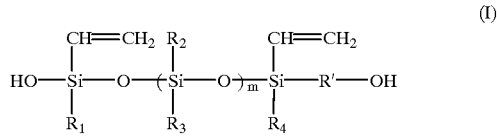

wherein m=25~50; $R_1$m $R_2$, $R_3$, and $R_4$, independently are —CH$_3$ or —CH$_2$CH$_3$; R' is R or OR, wherein R is a polymer backbone having a molecular weight of 1000~20000;

(b) introducing said mixture from step (a) into a cavity of a mold, in which a surface of the cavity is formed by a material having a critical surface tension greater than that of a polymer having a repeating unit of said R;

(c) curing said mixture in said cavity to form a shaped article;

(d) removing said shaped article from said mold;

(e) placing a polyurethane precursor on a surface of said shaped article which contacts said surface of said cavity; and (f) curing said polyurethane precursor to form an cured polyurethane bonding to said surface of said shaped article, so that a laminated composite is formed.

2. The process according to claim 1 further comprising (d') subjecting said shaped article to a heat treatment between step (d) and step (e).

3. The process according to claim 2, wherein said heat treatment is carried out at a temperature of 30° C. to 200° C. for a period of 10 minutes to 24 hours.

4. The process according to claim 1, wherein said polyurethane precursor in step (e) is a liquid mixture comprising a polyol, and a polyisocyanate, and optical a catalyst, wherein the molar ratio of OH group:NCO group=0.7:1 to 0.9:1.

5. The process according to claim 1, wherein said polyurethane precursor in step (e) is a solid polyurethane prepolymer having a tensile strength of 20~40 kg/cm$^2$ and an elongation ratio at break of 200~400%.

6. The process according to claim 1, wherein the curing in step (f) is carried out at a temperature of 60° C. to 80° C. for a period longer than 120 hours.

7. The process according to claim 1, wherein R in the formula (I) is

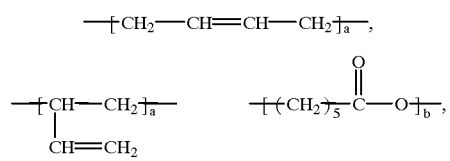

-continued

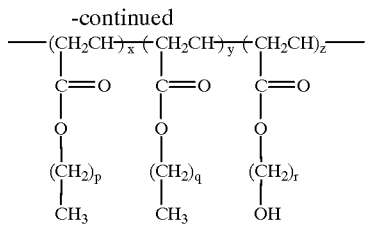

or a combination of each other, wherein a is an integer of 30~100; b is an integer of 20~80; y is an integer of 30~60; $z/(x+y)=0.01$~$0.25$; and p, q and r independently are an integer of 1~20.

8. The process according to claim 7, wherein a is an integer of 40~60.

9. The process according to claim 7, wherein b is an integer of 40~50.

10. The process according to claim 7, wherein $z/(x+y)=0.01$~$0.15$.

11. The process according to claim 7, wherein p=1, q=3, and r=2.

12. The process according to claim 1, wherein said curing agent for said silicone gel in step (a) is a compound comprising a repeat unit of the following formula:

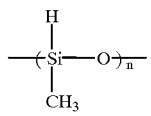

wherein n is a positive integer.

13. The process according to claim 1, wherein said silicone gel of addition type used in step (a) is a silicone having the following formula (II):

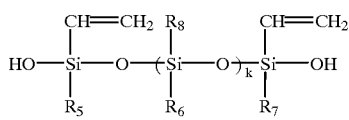

wherein k is a value so that the silicone (II) has a molecular weight of 1000~100000; and $R_5$, $R_6$, $R_7$, and $R_8$ independently are —$CH_3$ or —$CH_2CH_3$.

14. The process according to claim 1, wherein 0.5 to 10.0 parts by weight of said modifier was mixed in step (a) per hundred parts by weight of said silicone gel of addition type.

15. The process according to claim 1, wherein 1.0 to 3.0 parts by weight of said modifier was mixed in step (a) per hundred parts by weight of said silicone gel of addition type.

16. The process according to claim 1, wherein said curing in step (c) is carried out at a temperature from 60° C. to 80° C. for a period of 6 to 10 hours.

17. A process for preparing an addition type silicon rubber having an enhanced critical surface tension, which comprises the following steps:

(a) mixing a modifier, a silicone gel of addition type and a curing agent for said silicone gel to form a mixture, said modifier having the following formula (I):

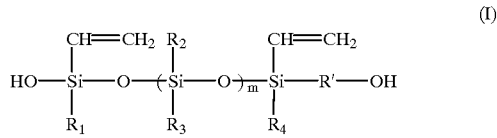

wherein m=25~50; $R_1$, $R_2$, $R_3$, and $R_4$, independently are —$CH_3$ or —$CH_2CH_3$; R' is R or OR, wherein R is a polymer backbone having a molecular weight of 1000~20000;

(b) introducing said mixture from step (a) into a cavity of a mold, in which a surface of the cavity is formed by a material having a critical surface tension greater than that of a polymer having a repeating unit of said R;

(c) curing said mixture in said cavity to form a shaped article.

18. The process according to claim 17, wherein R in the formula (I) is

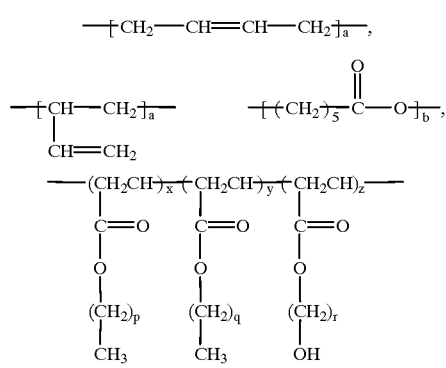

or a combination of each other, wherein a is an integer of 30~100; b is an integer of 20~80; y is an integer of 30~60; $z/(x+y)=0.01$~$0.25$; and p, q and r independently are an integer of 1~20.

19. The process according to claim 18, wherein a is an integer of 40~60.

20. The process according to claim 18, wherein b is an integer of 40~50.

21. The process according to claim 18, wherein $z/(x+y)=0.01$~$0.15$.

22. The process according to claim 18, wherein p=1, q=3, and r=2.

23. The process according to claim 17, wherein said curing agent for said silicone gel in step (a) is a compound comprising a repeat unit of the following formula:

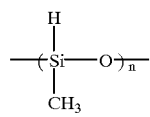

wherein n is a positive integer.

24. The process according to claim 17, wherein said silicone gel of addition type is used in step (a) is a silicone having the following formula (II):

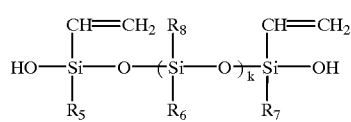

(II)

wherein k is a value so that the silicone (II) has a molecular weight of 1000~100000; and $R_5$, $R_6$, $R_7$, and $R_8$ independently are —$CH_3$ or —$CH_2CH_3$.

25. The process according to claim 17, wherein 0.5 to 10.0 parts by weight of said modifier was mixed in step (a) per hundred parts by weight of said silicone gel of addition type.

26. The process according to claim 17, wherein 1.0 to 3.0 parts by weight of said modifier was mixed in step (a) per hundred parts by weight of said silicone gel of addition type.

27. The process according to claim 17, wherein said curing in step (c) is carried out at a temperature from 60° C. to 80° C. for a period of 6 to 10 hours.

28. The process according to claim 17 further comprising (d') subjecting said shaped article to a heat treatment between step (d) and step (e).

29. The process according to claim 28, wherein said heat treatment is carried out at a temperature of 30° C. to 200° C. for a period of 10 minutes to 24 hours.

* * * * *